United States Patent [19]

Schwartz

[11] Patent Number: 4,685,634
[45] Date of Patent: Aug. 11, 1987

[54] PORTABLE RETRACTABLE REEL SYSTEM

[75] Inventor: Frederic W. Schwartz, Providence, R.I.

[73] Assignee: Cable Electric Products, Inc., Providence, R.I.

[21] Appl. No.: 859,960

[22] Filed: May 5, 1986

Related U.S. Application Data

[63] Continuation of Ser. No. 783,398, Oct. 3, 1985, abandoned, which is a continuation of Ser. No. 692,809, Jan. 7, 1985, abandoned, which is a continuation of Ser. No. 496,021, May 19, 1983, abandoned.

[51] Int. Cl.$^4$ ............................................ B65H 75/40
[52] U.S. Cl. ...................................... 242/96; 191/12.4
[58] Field of Search .................. 242/96, 84.8, 85, 106, 242/107, 107.7; 191/12.4, 12.2 R

[56] References Cited

U.S. PATENT DOCUMENTS

| | | | |
|---|---|---|---|
| 2,135,831 | 11/1938 | Nilsen | 242/125.1 |
| 2,856,470 | 10/1958 | Hyde | 191/12.4 |
| 3,369,084 | 2/1968 | Cook | 191/12.4 |
| 3,837,448 | 9/1974 | Hagstrom | 191/12.4 |
| 4,061,290 | 12/1977 | Harrill | 242/96 |
| 4,146,191 | 3/1979 | Cavanaugh | 242/107 |
| 4,196,864 | 4/1980 | Cole | 242/106 X |
| 4,244,536 | 1/1981 | Harrill | 191/12.4 |
| 4,282,954 | 8/1981 | Hill | 191/12.4 |
| 4,338,497 | 7/1982 | Drew | 191/12.4 |

Primary Examiner—John M. Jillions
Attorney, Agent, or Firm—Paul J. Sutton

[57] ABSTRACT

The present invention provides an extension cord reeling mechanism having electrical or telephone jacks for connecting the plugs of an appliance or the insert for a telephone. A truncated reeling member is rotatably connected to the flat rear wall of a cylindrical housing, with the reeling member having flanges that are rotatably set along the open circular edge of the housing. The reeling member has a cover having mounted to it a jack enclosure that includes jacks facing outward from the cover and a truncated cone side wall positioned in the housing about which an extension cord is reeled or unreeled. The extension cord is connected to the jack enclosure and extends through a chamber in the reeling member and a hole in the side of the chamber into the housing around the cone-shaped wall which acts as the mounting reel for the cord. The cord then passes from the housing through an aperture in the cylindrical side wall of the housing. The cord has a plug connected to its outer end. The cord can be manually reeled onto the reeling member in the housing or be manually unreeled from the reeling member, which rotates one way or the other depending on reeling or unreeling operation. A pin handle extends from the flange of the reeling member for the reeling operation.

5 Claims, 6 Drawing Figures

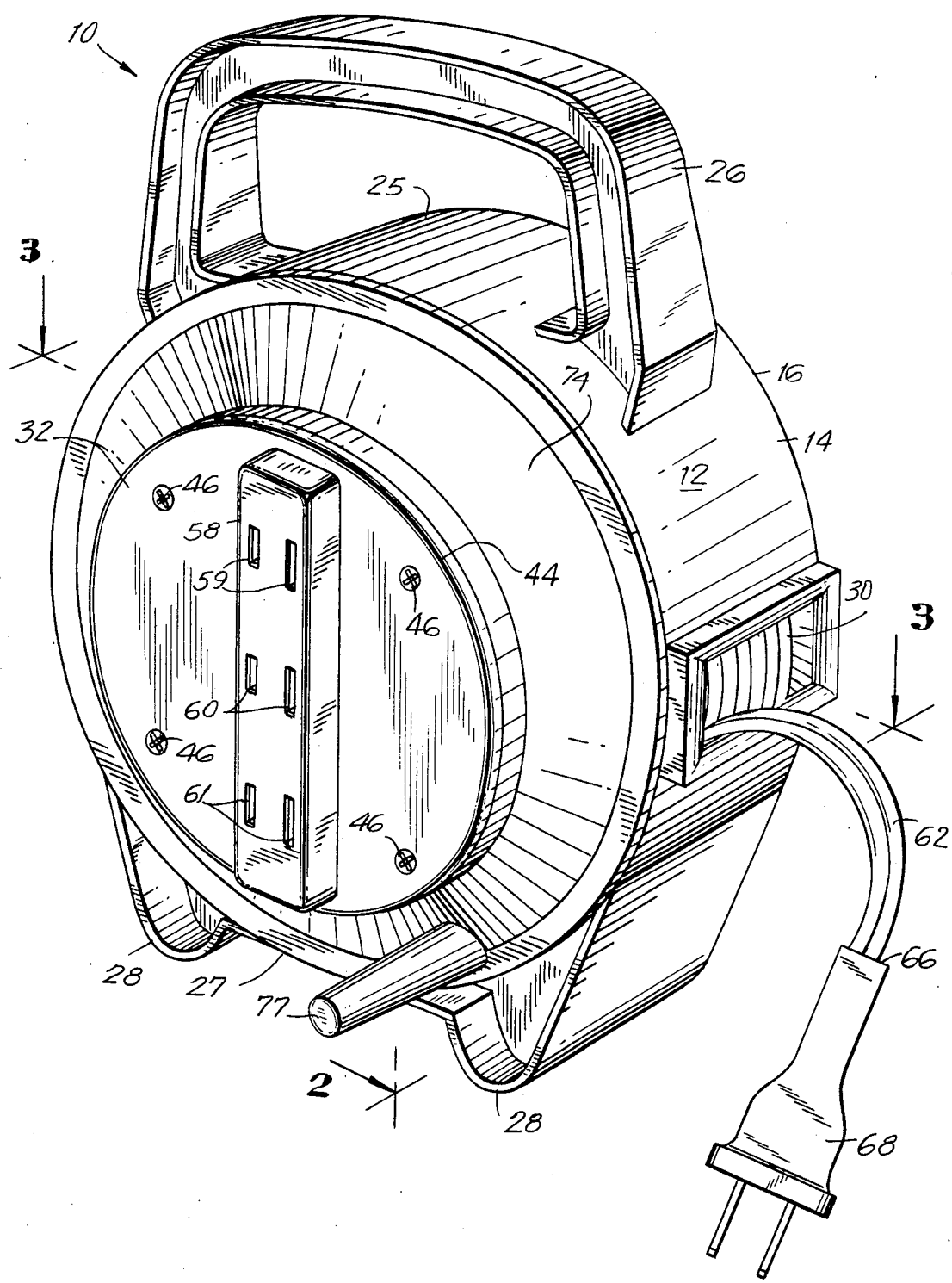

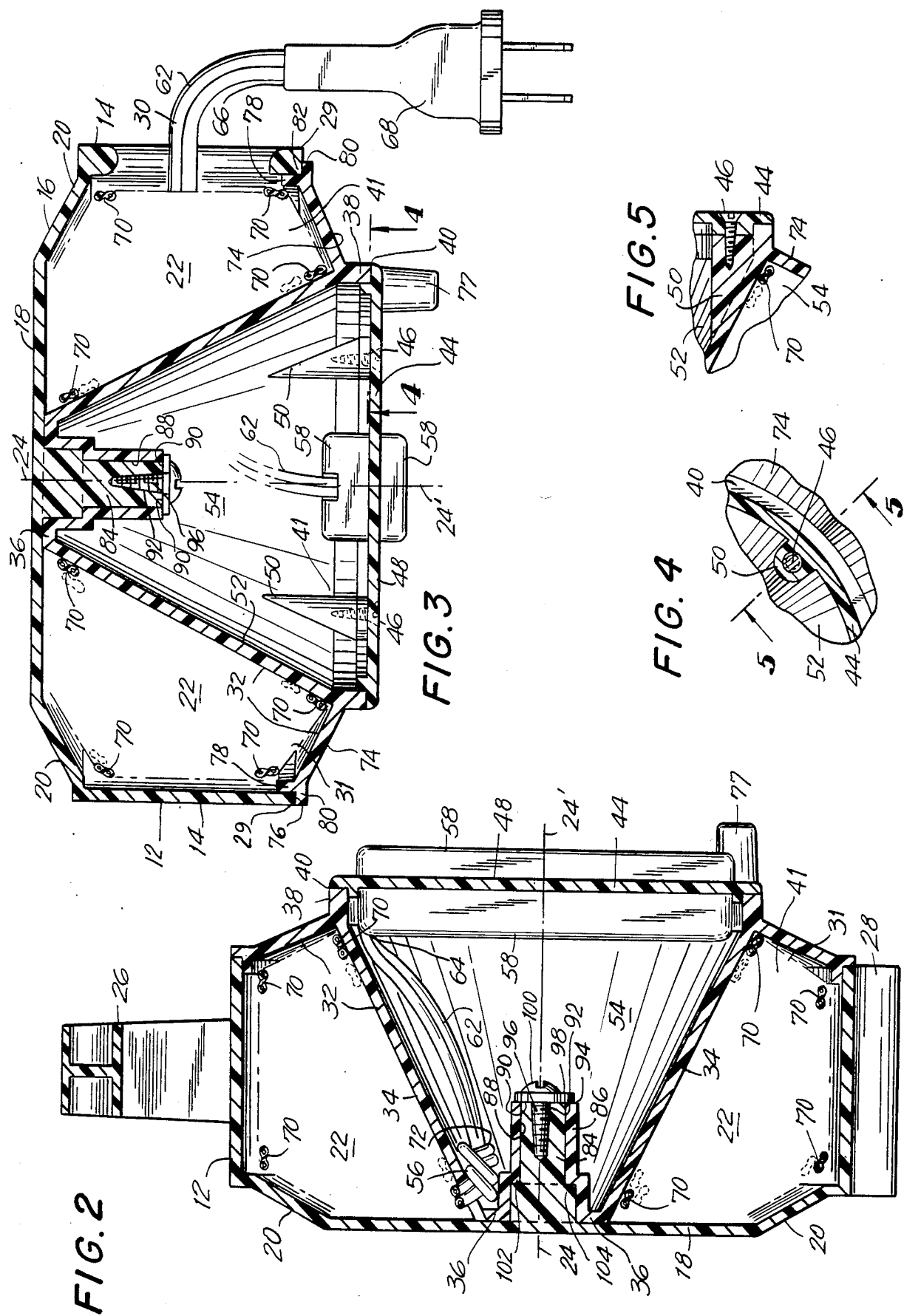

PORTABLE RETRACTABLE REEL SYSTEM

CROSS-REFERENCE TO RELATED APPLICATIONS

This application is a continuation of patent application Ser. No. 783,398, filed Oct. 3, 1985, now abandoned, which was a continuation of Ser. No. 692,809, filed Jan. 7, 1985, now abandoned, which was a continuation of Ser. No. 496,021, filed May 19, 1983, now abandoned.

This invention relates generally to extension cord connector reeling mechanisms and in particular to an extension cord connector reeling mechanism for connecting an electrical cord extension including a telephone extension cord to a power source and an appliance including a telephone.

The uses for extension cords are well known. Extension cords usually have a plug end and a jack end with the plug end for plugging into a power source such as a wall socket and the jack end for receiving the plug of an electrical appliance. Extension cords also are used to connect a telephone to a telephone power source outlet, with the telephone plugs and jacks having their own type of connector details but having analagous arrangements as the other type of electrical extension cords.

Because of the varied uses of extension cords, that include temporary hookups of electrical appliances to a power source or require regular or even constant movement of the appliance to the power source, reeling devices directed particularly on extension cords add efficiency and neatness to the use of such cords. The storage of extension cords during non-use is a desirable function, especially for extension cords of some length, for example, 25 feet cords, or 50 feet telephone cords.

Efficient reeling devices for cords in general are known, but a reeling device that combines the features of being an electrical connector, such as a multiple-plug connector, and of being a reel and cord storer, is particularly desirable.

Accordingly, it is an object of the present invention to provide a feeling mechanism for extension cords that also contains a plurality of jack receptacles to which the extension cord is electrically connected.

It is a further object of this invention to provide an electrical cord reeling mechanism with jack receptacles that includes a housing for the cord and a rotatable reeling mounting member about which the cord is wound.

It is a further object of this invention to provide a combined reeling and electrical connector mechanism for an extension cord that includes a reeling mechanism of cone shaped portion rotatably mounted in a housing with the cone-shaped portion being capable of being manually rotated and thus winding the electrical cord around the portion in the housing, the mechanism also being capable of unwinding the cord as it is being manually drawn from the mechanism.

It is another object of this invention to provide a telephone extension cord mechanism capable of being manually rotated and drawing in a telephone extension cord into a housing around a reeling member.

It is yet another object of my invention to provide a telephone connector and reeler that has telephone jacks and a telephone cord connected to the jacks and wound up around a rotatable reel in the housing of the mechanism, the mechanism being capable of unwinding the cord when the cord is drawn from the mechanism.

The novel means and arrangements employed to meet the objects above ennumerated and to meet the common needs of those employing extension cords is an electrical extension cord connector reeling mechanism including the following elements and inventive features. A cylindrical housing having a rear wall and a cylindrical side wall is provided. The housing has an open side opposite the rear wall. A reeling member of conical shape is coaxially and rotatably positioned in the housing. The reeling member has a truncated cone shape and a truncated cone wall that is rotatably connected to the rear wall of the housing. The base portion of the cone-shaped reeling member extends from the housing at the open wall of the housing. A circular flange extends around the base portion of the reeling member, the edge of the flange being rotatably secured to the circular edge of the housing at the open side. A cover is secured to the top of the reeling member to which is mounted a jack enclosure that contains conventional electrical connectors and a plurality of jack receptacles facing outward from the cover. A chamber is formed inside the reeling member by the conic side wall, truncated connecting wall, and the cover. An electrical connecting cord is electrically connected to the jack enclosure, passes through a hole in the chamber to inside the housing where the cord, in a first position, is wound around the cone-shaped wall of the reeling member and then passes through an aperture in the cylindrical side wall of the housing. A plug is connected to the outside end of the connector. The cord can be manually pulled from the mechanism and the reeling member rotates, allowing the cord to be released from around the reeling member. The cord can be reeled into the housing by way of gripping a finger handle extending from the flange. When the pin is used to rotate the reeling member along with the cone-shaped portion inside the housing, the cord is reeled back into the housing around the cone-shaped portion. Means is provided to lock the cord to the reeling member in the chamber.

The invention will be more clearly understood from the following description of specific embodiments of the invention together with the accompanying drawings, wherein similar reference characters denote similar elements throughout the several views, and in which:

FIG. 1 is a perspective view of an embodiment of the invention;

FIG. 2 is a sectional elevational view taken along line 2—2 of FIG. 1;

FIG. 3 is a sectional top view taken alone line 3—3 of FIG. 2;

FIG. 4 is a fragmentary sectional view taken along line 4—4 in FIG. 3;

FIG. 5 is a fragmentary sectional view taken along line 5—5 in FIG. 4; and

Figure 6:
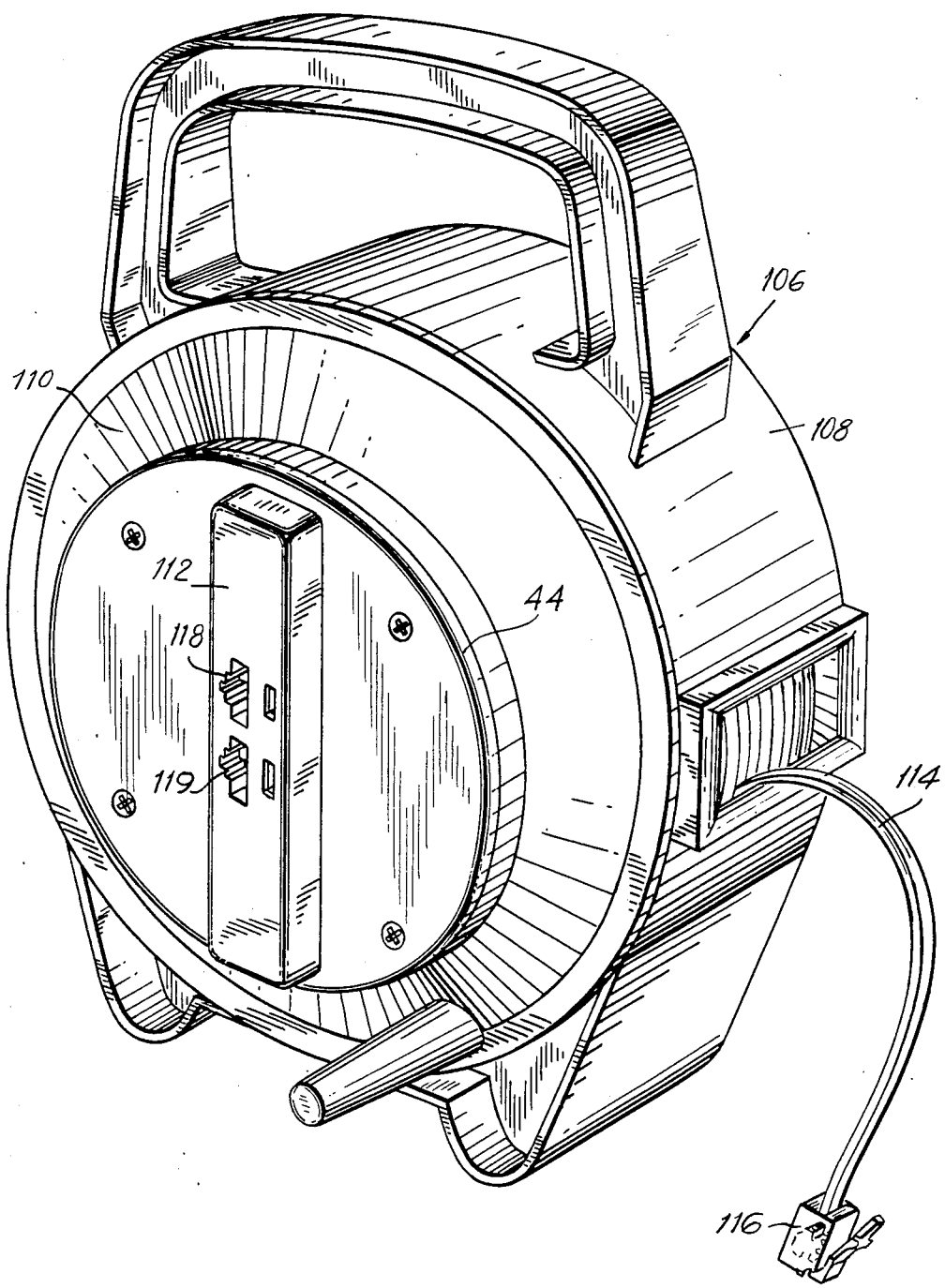
FIG. 6 is a perspective view of an embodiment of the invention having the telephone jacks.

Reference is now made in more detail to the drawings.

An electrical extension cord reel mechanism 10 is shown in a perspective illustration in FIG. 1. A cylindrical housing 12 made of a suitable non-conductive material such as plastic has an enclosing cylindrical side wall 14 and a rear wall 16 (shown in section in FIGS. 2 and 3) intersecting side wall 14. Rear wall 16 preferably includes a flat portion 18 and a circular tapered, or angled, portion 20 that connects side wall 14 with rear wall 16. Rear wall 16 and side wall 14 define a housing compartment 22 which is substantially cylindrical in configuration and includes an imaginary axis 24. Flat portion 20 of rear wall 16 is in a plan substantially perpendicular to the imaginary axis 24. Cylindrical housing 12 has a circular edge 29 along the side wall 14 which defines an open side 31 which opposes rear wall 16.

As shown in FIG. 1, reel mechanism 10 is provided with a handle 26 connected to the top portion 25 of side wall 14 and with a pair of feet 28 that extend from opposite sides of the bottom portion 27 of side wall 14. An aperture 30 is formed in side wall 14 approximately midway between the top and bottom portions of housing.

A reeling member 32 having the configuration of a frustrum, or truncated cone, having an axis 24' coaxial with axis 24 is coaxially and rotatably mounted in cylindrical housing 12. Reeling member 32 has a conical side wall 34, a circular truncated wall 36 that is rotatably connected with flat portion 18 of rear wall 16 and a circular flange 74 at its base end line 20, delete "e and". Reeling member 32 further has a base portion 38 that includes a circular edge portion 40 having a larger diameter than circular truncated wall 36 and that defines an open face 41 that opposes truncated wall 36.

A plurality of jack receptacles 59, 60, and 61 are mounted on a circular substantially flat cover member 44 that covers open face 41 of reeling member 32 and that has a circular outer edge that is substantially coextensive with circular edge portion 40 of reeling member 32. As seen in FIGS. 1, 3, 4, and 5, cover member 44 is affixed to reeling member 32 at circular edge portion 40 preferably by four bolts 46(two of which are seen in FIG. 3) that extend from the outside surface 48 of cover member 44 through the cover member into screwed connection with each of four bolt holes formed in four mounting brackets 50 positioned equiangularly about and extending inwardly from the inner surface 52. Only two of brackets 50 are illustrated in FIG. 3, it being understood that the remaining brackets are present to receive bolts 46 of conical side wall 34, the bolt holes extending approximately parallel to axis 24'.

Truncated wall 36, conical side wall 34, and cover member 44 define a chamber 54 within reeling member 32. Conical side wall 34 forms a hole 56 that opens to compartment 22 of housing 12 and chamber 58.

As seen in FIGS. 1, 2, and 3, a jack enclosure 58 is mounted on cover member 44. Enclosure 58 forms three sets of jack receptacles 59,60, and 61 adapted to receive the prongs of three plugs. Three sets of receptacles are illustrated by way of example, but of course one, two, four, or more sets of receptacles could be included within the spirit of the invention. Jack receptacles 59,60, and 61 face outward from outer surface 48 of cover member 44. Jack enclosure 58 preferably is oriented vertically extending between top and bottom portions 25 and 27 with receptacle sets 60 likewise being oriented vertically. Jack enclosure 58 also contains conventional connectors adapted to connect the electrical conductors of a cord with connectors associated with receptacles 59, 60, and 61.

An electrical extension cord 62 having a connector end 64 connected to jack enclosure 58 and an opposite end 66 connected to a cord plug 68 is extended through aperture 30 of housing 12 with plug 68 positioned outside housing 12. Cord 62 is movable to a plurality of positions between and including a first position and a second position, both of which will be described. The first position of cord 62 is when the cord is fully wound in housing 12 around conical side wall 34 of reeling member 32. FIG. 1 illustrates this position as seen from outside housing 12 where cord plug 68 is positioned proximate to housing 12 and aperture 30. FIGS. 2 and 3 indicate cord 62 in the first, or fully wound position, by indicating cord cross-sections 70 which illustrate the general position of cord 62 wound around conical side wall 34 of reeling member 32 in compartment 22 of the housing. In the second position, which is not illustrated, cord 62 is fully unwound from around conical side wall 34 and is fully extended through aperture 30 from housing 12, with plug 68 being distal from housing 12 and aperture 30.

Cord 62 as noted above is, as shown in FIG. 3, connected to jack enclosure 58 where cord 62 is placed in electrical connection with the outside connectors in a conventional manner in the enclosure associated with the three receptacles 59,60, and 61 to which an outside plug of an electrical appliance is connected. Cord plug 68 is to be connected to the socket of an electrical source, such as a wall socket.

Cord 62 extends through hole 56 in conical side wall 34 of reeling member 32, so that the cord passes from compartment 22 to chamber 54 of reeling member 32 and on to jack enclosure 58. Cord 62 is preferably connected to reeling member 32 so as to prevent tension between cord connector end 64 and the electrical connectors contained in jack enclosure 58, especially when cord 62 is being extended or is in the second, or extended, position. This is preferably accomplished by means of tying cord 62 into a single knot 72 within chamber 54 proximate to hole 56. Knot 72 is arranged so that it is larger than hole 56 so that during any time that cord 62 is under tension while being pulled out from housing 12, knot 72 will be drawn against inner surface 52 of conical side wall 34 at hole 56 thus locking the cord to reeling member 32 at that portion and freeing connector end 64 of the cord free from pulling tension at jack enclosure 58, that is, tension on the cord will be absorbed at the knot at hole 56.

As mentioned previously, reeling member 32 is rotatably mounted in cylinder housing 12. The rotational connection is made specifically between rear wall 16, specifically at flat portion 18, of housing 12 and circular truncated wall 36 of reeling member 32. In addition, circular flange 74 that has a circumferential edge portion 76 extends from around cover member 44. Circumferential edge portion 76 of the flange is rotatably coextensive with circular edge 29 of open side 41 of housing 12. As best seen in FIGS. 2 and 3, circular edge portion 40 of reeling member 32 extends beyond circular edge 29 of cylinder housing 12 so that flange 74 extends at an angle from circular edge portion 40 to circular edge 29, where it meets cylinder side wall 14. At this point, flange 74 has a pair of lips 78 and 80 extending horizontally and vertically respectively from circumferential edge portion 76 which lips together form a circumferential keeper 82 which is adapted to receive circular edge 29 of housing 12 in slidable connection.

A pin handle 77 is connected to and extends outwardly from flange 74 substantially parallel to axis 24' of reeling member 32. Pin handle 77 provides a handle for a user to manually rotate reeling member 32 so as to draw cord 32 around conical side wall 34 when the cord is partially or fully unwound from the housing.

Rear wall 16 and truncated wall 36 are rotatably connected, thus rotatably connecting reeling member 32 to cylindrical housing 12, as follows. A cylindrical axle member 84 is mounted with and connected to cylinder housing 12 at flat portion 18 of rear wall 16. Axle member 84 extends into compartment 22 of the housing coaxially with axis 24. Bearing member 86 is mounted to reeling member 32 and extends into chamber 54. Bearing member 86 forms a bearing through-bore 88 coaxial with axis 24' of the reeling member and axis 24 of the cylindrical housing and of axle 84. Axle 84 is positioned within bore 88. Axle 84 has a circular end wall 90 and forms a threaded bore, or hole, 92 opening at circular end wall 90. Axle threaded bore hole 92 is coaxial with axes 24 and 24'. Bearing member 86 has a bore open end 94 positioned in chamber 54 where bore 88 opens. Bore end 94 and end wall 90 are substantially aligned in chamber 54. An axle bolt 96 is threaded into threaded hole 92 and a washer 98 is positioned between bolt head 100 and bore end 94 so that reeling member 32 is rotatably fastened to cylindrical housing 12.

Axle member 84 is positioned relative to bearing member 86 by means of a circular stop portion 102 extending around the base of axle 84 at rear wall 16 and a circular stop recess 104 formed by bearing member 86 at truncated wall 36; stop portion 102 is rotatably seated in stop recess 104. Stop portion 102 acts as a shoulder against movement of bearing member 86 against rear wall 16.

In operation, beginning from the first or wound position of cord 62 in housing 12, plug end 66 of the cord is pulled from the housing. Reeling member 32, around conical wall 34 of which cord 62 is wound, rotates, thus allowing the cord to be unwound. Cord plug 68 is thereupon plugged into an electrical socket(not shown) as the power source. Following this, an appliance plug (not shown) is plugged into one of the three receptacles 59,60, or 61, thus supplying power to the appliance. Cord 62 is then further unwound to any of a plurality of positions including the final second position where cord 62 has been fully unwound. Of course, the cord may be unwound and taken to the appliance prior to plugging in the appliance, and, again, the appliance may first be plugged into one of the receptacles and then the appliance plugged into the power source. Also, in the preferred embodiment, three separate appliances may be plugged into mechanism 10.

The process may be reversed by unplugging plug 68 from the power source and the appliance plug from the receptacles of the appliance. Then reeling member 32 is rotated by means of pin handle 77 thus drawing cord 32 around reeling member 32 at conical side wall 34. It is noted again that tension on the cord during the winding process is absorbed at knot 72 against inner surface 52 of conical side wall 34.

FIG. 6 illustrates a second embodiment of the invention. As shown, a reeling mechanism 106 with a cylindrical housing 108 with a reeling member 110 with a jack enclosure 112 vertically positioned on cover member 44 is provided with a telephone extension cord 114 with a telephone plug inset 116 connected to the outside end of cord 114. Two vertically oriented telephone jacks 118 and 120 are formed by jack enclosure 112 and are adapted to receive the plug inserts of a telephone connector(not shown). Reeling mechanism 106 is analagous in arrangement and construction to reeling mechanism 10, with, for example, housing 108 and reeling member 110 being the same as housing 12 and reeling member 32 of mechanism 10. Jack enclosure 112 is analagous to jack enclosure 58 of mechanism 10. The interior elements of the embodiment shown in FIG. 6 are analagous in arrangement and construction to the interior element of mechanism 10. Telephone extension cord 114, of course, is of a different, in particular or less, thickness than extension cord 62, and therefore the cord length able to be held in mechanism 106 is greater than the amount of cord able to be held in mechanism 10.

The embodiments of the present invention particularly disclosed are presented merely as examples of the invention. Other embodiments, forms, and modifications of the invention coming within the proper scope of the appended claims will, of course, readily suggest themselves to those skilled in the art.

What is claimed is:

1. An electrical extension cord connector reeling mechanism, in combination, comprising:
   a cylindrical housing having a rear wall and a cylindrical side wall forming an aperture, and a circular edge defining an open side opposing said rear wall,
   a truncated conical reeling member coaxially mounted in said cylindrical housing, said reeling member having a conical side wall, with a generally upwardly extending circular flange at one end and a truncated wall at the other end, rotatably attached to said rear wall, and further having a base portion at the flanged end, said flange comprising an interface on its outer edge which is rotatably coextensive with said circular edge of said open side of said housing,
   jack means mounted to said base portion for receiving at least one plug,
   an electrical extension cord having a connector end connected to said jack means and an opposite end connected to a cord plug, said cord being extended through said aperture with said plug positioned outside said housing, said cord being movable to a plurality of positions between and including a first position and a second position, said first position being wherein said cord is fully wound in said housing around said conical side wall of said reeling member and said second position being wherein said cord is fully unwound from said reeling member and is fully extended from said housing,
   means for passing said cord from within said housing to said jack means,
   means connected to said reeling member for rotating said reeling member and winding said cord into said housing,
   means for rotatably attaching said truncated wall to said rear wall, and means for connecting said cord to said reeling member.
   wherein said means for rotatably attaching said truncated wall of said conical reeling member to said rear wall of said housing includes an axle member coaxially mounted with said cylindrical housing at said rear wall and extending into said housing, said axle member having a circular end wall which includes a hole coaxially with said axle for receiving a fastener,
   said truncated wall is formed into a bearing member that extends into said chamber, is coaxial with said conical reeling member and said axle, and is rotatably mounted on said axle member,
   said axle having a circular stop portion near the end wall, said bearing member having a circular stop recess for rotatably mating with said circular stop portion, and having a bore open end, said circular stop recess and said bore open end are located so that the bore open end is in substantial alignment with the axle's circular end wall when the stop recess is mated with the stop portion, and said axle circular stop portion is spaced from the end wall sufficiently so that when the stop recess is mated with the stop portion, there is no contact between the truncated wall and the housing rear wall.

2. A mechanism according to claim 1 wherein said base portion of said reeling member includes a circular edge portion of said conical wall defining an open face opposing said truncated wall, said jack means including a circular substantially flat cover member covering said open face of said reeling member and coextensive with and connected to said circular edge portion, said cover member including said circular flange, said jack means further including a jack enclosure mounted on said cover member and having at least one set of jack receptacles facing outward from said cover member.

3. A mechanism according to claim 2 wherein said flange interface comprises a circumferential keeper which includes a pair of lips adapted for receiving said circular edge of said open side of said housing in slidable connection, wherein one lip is located forward and the other is located inward of the open side circular edge.

4. A mechanism according to claim 2 or 3 wherein said means for passing said cord to said jack means includes said truncated wall, said conical wall, and said flat member defining a chamber, said conical wall forming a hole into said chamber, said cord extending from within said housing through said hole into said chamber, and said connecting end of said cord being connected to said jack enclosure.

5. A mechanism according to claim 2, further including means for affixing said cover member to said circular edge portion of said reeling member, said means for affixing including four bracket members extending inwardly from and positioned equiangularly about the inner surface of said conical wall of said reeling member, said bracket members forming four threaded bolt holes extending approximately parallel to the axis of said reeling member, and four bolts extending through said cover member into screwed connection with each of said bolt holes, said circular end wall hole is threaded, and said fastener comprises a threaded bolt and thrust face means having sufficient diameter to engage the bore open end when the bolt is screwed into the end wall hole for holding the bore open end in substantial alignment with the axle's circular end wall.

* * * * *